United States Patent Office 2,840,571
Patented June 24, 1958

2,840,571

PROCESS OF SYNTHESIZING ETHYL-PARA-BENZOQUINONE

Rolf Karl Ladisch, Lansdowne, Pa., assignor to the United States of America as represented by the Secretary of the Army No Drawing. Original application April 14, 1955, Serial No. 501,457. Divided and this application August 10, 1956, Serial No. 603,452

2 Claims. (Cl. 260—396)

(Granted under Title 35, U. S. Code (1952), sec. 266)

The invention described herein, if patented, may be manufactured and used by or for the Government for governmental purposes, without the payment to me of any royalty thereon.

This invention relates to a process of producing ethyl-para-benzoquinone synthetically.

Ethyl-para-benzoquinone is a principal quinone produced by the life processes of certain flour beetles *Tribolium castaneum* (Herbst) and *Tribolium confusum* (Duval), but as insect-derived quinones are often not available, it is believed to be highly desirable to synthesize ethyl-para-benzoquinone by an inexpensive procedure such as this invention provides. Ethyl-para-benzoquinone is needed for research, as it has been shown by the applicant (Spies, T. D., J. Am. Med. Assoc. 153, 189–1953), that insect-derived quinones, substantially consisting of ethyl-para-benzoquinone, may propagate malignant tumors in rats. However, extensive inquiry indicates that ethyl-para-benzoquinone is not available on the market. The invention herein described gives scientists and laboratory technicians an inexpensive method of making ethyl-para-benzoquinone as the first step in research along the lines indicated above.

The process may be described in terms of an actual laboratory procedure using small quantities, with the understanding that much larger quantities may be handled using different equipment.

A slurry consisting of 500 ml. of water, 85 ml. (1.46 mols) of concentrated sulphuric acid, and powdered Dry Ice (solid $CO_2$), was prepared in a breaker kept in a Dry Ice-alcohol bath. The quantity of sulphuric acid (1.46 mols) in the slurry was in stoichiometric excess of the o-ethylaniline (.165 mol) added during the following step. Then 20 g. (.165 mol) of o-ethylaniline was added to the slurry and stirred, following which 50 ml. of a 50% aqueous solution of $Na_2Cr_2O_7$ (about .13 mol) was added and stirred. More powdered Dry Ice was added to produce a hard but free moving mass. The color of the mixture turned from an initial light yellow to dark brown. The beaker containing the mixture was placed in a refrigerator for eighteen hours, during which period the mixture turned to a blue-black liquid mass with a strong smell of quinone. With the mixture maintained below 5° C., 100 ml. of a 50% aqueous solution of $Na_2Cr_2O_7$ (about .26 mol) was added dropwise over a period of two hours with mechanical stirring; thus, the total amount of alkali metal dichromate added as the oxidizing agent was 150 ml. of 50% solution, or about .39 mol, which amount was in stoichiometric excess of the amount of o-ethylaniline (.165 mol). Then 600 ml. of 2-methyl-butane, a substantially water-immiscible organic solvent having a low freezing point, was added, with stirring for one hour. At this point, a thinly viscous mass was obtained which when placed in a column and allowed to stand in a refrigerator, separated into two phases. The upper layer of 2-methyl butane containing the quinone was siphoned off. Crude ethylquinone in crystals formed when cooling the solvent to −70° C. or below. These crystals were collected by filtering through a filter with a fritted glass disk, then washing with some solvent and drying in the air. The blue-black residue in the column was extracted three more times with the solvent recovered from the filtrate. The crude ethyl-para-benzoquinone was purified by sublimination in vacuo. Yield, 45% crude, 40% pure. Melting point of the pure product, 38.5°–39.5° C.

Instead of adding 2-methyl-butane to remove the quinone, it may be removed by extracting with a solvent and evaporating the solvent, or by resorting to steam distallation, as will be understood by those skilled in the art.

This application is a division of my pending application Ser. No. 501,457, filed April 14, 1955, entitled "Process of Dyeing Protein Fibers by Means of Insect Quinones."

Having described my invention, I claim:

1. A process of making ethyl-para-benzoquinone which comprises adding o-ethylaniline to a slurry of a stoichiometric excess of sulphuric acid, water and comminuted Dry Ice, adding a first portion of an aqueous solution of an alkali metal dichromate, adding more comminuted Dry Ice to produce a hard but free moving mass, holding the mass under refrigeration below 5° C. for several hours until a quinone begins to form, gradually adding a second portion of an aqueous solution of alkali metal dichromate, said second portion of alkali metal dichromate being larger than said first portion and in slight stoichiometric excess of said o-ethylaniline, adding a substantially water-immiscible organic solvent having a low freezing point, holding the mixture under refrigeration until it separates into two phases, separating the upper phase which contains ethyl-para-benzoquinone in solution, cooling the solution to at least about −70° C. whereby crude ethyl-para-benzoquinone crystals are formed, collecting said crystals, and purifying said crystals.

2. A process of making ethyl-para-benzoquinone which comprises making a slurry of water, about 85 ml. concentrated sulphuric acid and powdered Dry Ice, adding about 20 g. o-ethylaniline to the slurry, adding about 50 ml. of an about 50% aqueous solution of an alkali metal dichromate with stirring, adding more powdered Dry Ice to produce a hard but free moving mass, holding the mass for about 18 hours near the freezing point to start the formation of a quinone, adding about 100 ml. of alkali metal dichromate solution slowly with stirring, adding 2-methyl-butane slowly with stirring, holding the mixture under refrigeration for a sufficient time to separate into two phases, separating the upper phase which contains a solution of ethyl-para-benzoquinone in 2-methyl-butane, cooling the solution to at least about −70° C. whereby crude ethyl-para-benzoquinone crystals are formed, collecting said crystals, and purifying said crystals.

References Cited in the file of this patent

UNITED STATES PATENTS

| | | |
|---|---|---|
| 2,343,768 | Gibbs | Mar. 7, 1944 |
| 2,731,478 | Kamlet | Jan. 17, 1956 |

OTHER REFERENCES

Nietzki: Annalen der Chemie, vol. 215, page 158 (1882).